United States Patent [19]

Danloup

[11] Patent Number: 4,723,351
[45] Date of Patent: Feb. 9, 1988

[54] PROCESS AND DEVICE FOR MOUNTING A NASAL REST PAD AND SPECTACLE FRAME FOR ITS APPLICATION

[75] Inventor: André Danloup, Saint Mihiel, France

[73] Assignee: Essilor International, Creteil, France

[21] Appl. No.: 735,557

[22] Filed: May 17, 1985

[30] Foreign Application Priority Data

Jun. 4, 1984 [FR] France .............................. 84 08719

[51] Int. Cl.$^4$ ............................................. B21D 39/00
[52] U.S. Cl. ...................................... 29/451; 29/452; 351/137
[58] Field of Search ................. 29/433, 450, 451, 452, 29/505; 351/136, 137

[56] References Cited

U.S. PATENT DOCUMENTS

| 2,157,247 | 5/1936 | Schumacher | 351/137 X |
| 4,045,137 | 8/1977 | Bradley, Jr. | 351/137 X |
| 4,638,544 | 1/1987 | McNeil | 29/450 |

Primary Examiner—Timothy V. Eley
Attorney, Agent, or Firm—Burgess, Ryan & Wayne

[57] ABSTRACT

The invention applies to a device for mounting a nasal rest pad on a support member integral with a rim or eyewire of a spectacle frame, comprising a resilient piece that is drawn out in order to be passed in a loop of the arm and in an ear of the pad, and this piece is thereafter released and constricted in the loop and the ear, thus assembling the rest pad to the support arm and the device is applied to a spectacle frame automatically adapted to noses of various shapes.

3 Claims, 3 Drawing Figures

PROCESS AND DEVICE FOR MOUNTING A NASAL REST PAD AND SPECTACLE FRAME FOR ITS APPLICATION

BACKGROUND OF THE INVENTION

1. Field of the Invention

The present invention concerns a process and a device for mounting a nasal rest pad. Said invention also concerns a spectacle frame comprising nasal rest pads mounted by means of utilizing said device.

2. Description of the Prior Art

In the spectacle industry, spectacle frames are normally provided with fixed or detachable nasal rest pads. The pads are applied to the sides of the nose through the weight exerted by the spectacle frame. When the rest pads are detachable, they can thus assume a position that can be adapted more or less closely to the shape of the wearer's nose, according to the amount of freedom granted to each pad. Very often, the pad can turn around a single axis, which only provides one degree of freedom. This is insufficient to allow a good adaptation on noses of various shapes and sizes, especially those having various flat or smooth forms, such as are frequently found among multiracial nations or countries where the populations are highly mixed. In order to overcome this drawback, opticians are often compelled to deform manually the support members of the pads, so as to adapt, as much as possible, each spectacle frame to its wearer's physionomy.

Another solution consists in giving a greater degree of freedom to the pad, through an appropriate mounting of said plate on the spectacle frame. French Pat. No. 1,167,045 proposes a ball and socket joint assembly of the pad. Due to this assembly, the pad can swivel in several different directions in space, which allows a good adaptation of this pad, under the effect of the weight of the spectacle frame and the lenses, to the shape of the wearer's nose.

Nevertheless, the mounting or assembly described in the abovementioned patent also comprises a support arm for the pad, said arm being extended by a tail whose purpose is to act as an abutment, in order to limit the amplitude of the swivelling of the pad. This limitation can prove to be troublesome, especially for particularly flat noses.

OBJECTS AND SUMMARY

The aim of the present invention is to establish a process and to provide a device for mounting a nasal rest pad, that possesses a large capacity of adaptation for noses of very varied forms.

The present invention also has the aim of establishing such a mounting process, which is particularly simple to put into practice.

The present invention has furthermore the aim of producing a spectacle frame which applies the process for mounting the nasal rest pads according to the invention.

The aims of the invention are achieved with a process for mounting a nasal rest pad upon a spectacle frame, wherein:

a. the tapered end of a piece made of rubber-type elastic or resilient material is passed through a hole formed in the pad and through another hole formed in the spectacle frame;

b. this piece is drawn out in order to place in these holes a portion of the piece the transverse cross-section of which at rest is greater than those of the holes;

c. the piece is thereafter released so as to be blocked in the holes by returning to its rest section, in order to thus assemble the rest pad and the frame.

In order to put into practice this process, the invention provides a device comprising:

1. a nasal rest pad bored with a hole;
2. a support member for this pad, integral with the spectacle frame and bored with a hole centered on the pivoting axis provided for the pad.

According to the invention, this device comprises:

3. an elastic or resilient piece, made from a rubber-type material, passed coaxially through the holes of the rest pad and the support member while it is in a drawn out condition, then released in order to be constricted within these holes by resiliently pushing the pad against the support member.

BRIEF DESCRIPTION OF THE DRAWING

Other objects, advantages and features of the invention will become apparent from reading through the following description, given with reference to the appended drawings in which.

DESCRIPTION OF A PREFERRED EMBODIMENT

Figure 1:
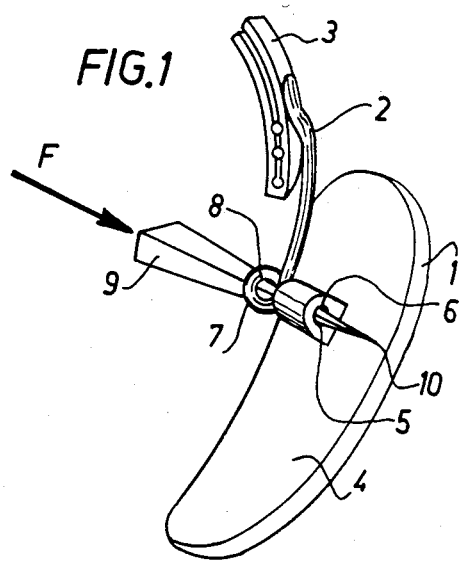
FIG. 1 is a view in perspective of the device according to the invention, during a stage preparatory to the mounting of the nasal rest pad.
Figure 3:
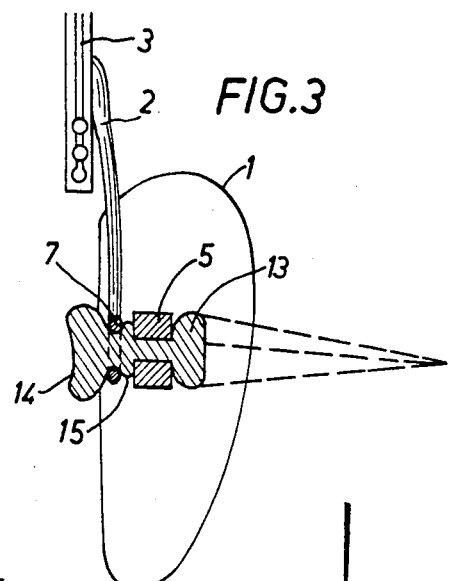
FIG. 3 represents an axial cross-section of the resilient piece and the holes of the support member and of the rest pad, in the final form of mounting.

With reference to the drawing, FIG. 1 represents a nasal rest pad 1 in a pre-mounting position with respect to a support member 2 of this rest pad, integral with an eyewire or rim 3 of a spectacle frame. The rest pad presents a nasal rest side (concealed on the drawing) and an opposite side 4, from which protrudes an ear 5 bored with a hole 6 having an axis substantially parallel to the rest side.

The support member assumes the form of a wire, for example made of metal, fixed by one end to eyewire 3. Its other end is formed according to a loop 7 surrounding a hole 8 having a diameter substantially equal to that of hole 6 of rest pad 1.

According to the invention, the rest pad is mounted upon its support member by means of a resilient piece 9 presenting a tapered end 10 adapted to allow it to pass freely in holes 6 and 8, when they are coaxially disposed adjacent to each other. The length of piece 9 is such that it largely protrudes beyond these holes, on both the side of its tapered end and on the side opposite that end.

Piece 9 is made of a rubber-type or elastomeric flexible material. A synthetic elastomer such as neoprene is particularly well suited for this purpose.

Figure 2:
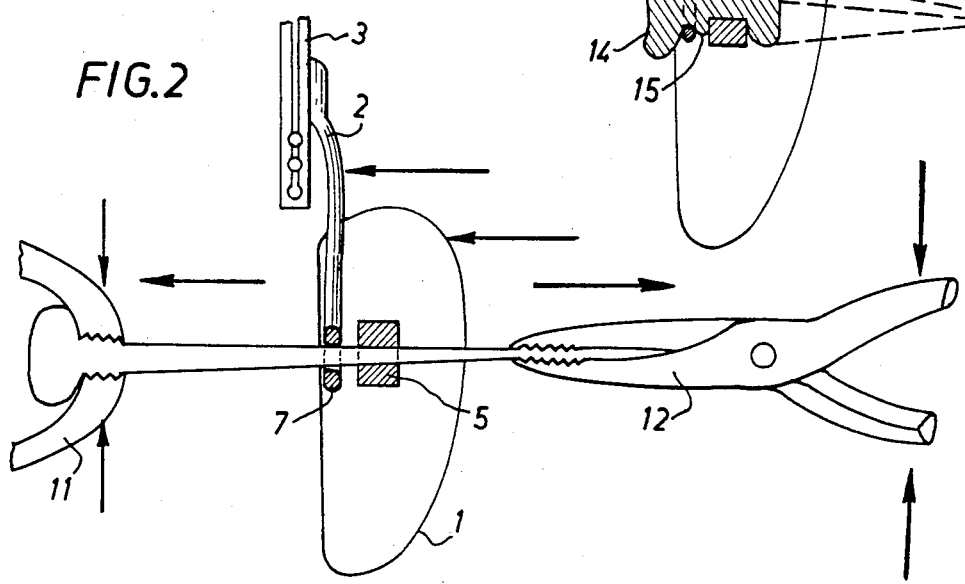
FIG. 2 represents a schematic view that assists in explaining how the resilient piece is passed through the holes of the nasal rest pad and its support member.

Once this piece has passed through holes 6 and 8, according to the direction of arrow F and until it is stopped by the internal walls of the holes, this piece is drawn out (FIG. 2) by applying axial efforts thereto. In order to do this, the end opposite tapered end 10 is gripped with a tool 11 such as pincers, and the tapered end is seized with a clamp 12. Thereafter, tool 11 and clamp 12 are spread away from each other in such a way that, due to its flexibility, the section of piece 9, in its median portion, diminishes by drawing out until it becomes smaller than that of the holes. This median portion thus being centred in these holes, the traction or pull exerted on piece 9 is suppressed, so that its median portion tends to return to its transverse cross-section prior to drawing out, the cross-section being greater than those of the holes. There is thus a restriction of this median section in these holes and a blocking of piece 9, which provokes the assembly of rest pad 1 on support member 2. This blocking is completed by the formation of ridges or folds 13 and 14 outside holes 6 and 8, upon release of the constraint exerted upon piece 9. These folds are caused by the reflux of the elastic material previously drawn out, against these holes. The form of these folds can be improved by cutting the excess terminal portions of the resilient piece.

The purpose of the folds is to charge ear 5 of the pad towards loop 7 of the support member. A secured, but flexible mounting is thus achieved, due to the fact of the elastic character of pad piece 9, on the support member. This flexibility is further improved by the formation of an intermediary fold 15 in the resilient piece, between loop 7 and ear 5. This fold permits a certain pivoting of the nasal rest plate around axes perpendicular to the axis of resilient piece 9. The rest pad can thus pivot around this latter axis, due to the elastic connection established between the rest pad and the support member. Therefore, the rest pad has several degrees of freedom, thereby facilitating its application, under the effect of the weight of a pair of spectacles thus equipped, on various forms of noses and especially flat noses. Furthermore, the slight elastic charge developed by piece 9 on the rest pad ensures the maintaining in contact of this rest pad on the corresponding side of the wearer's nose, thereby contributing to the stability of the spectacle frame on the nose. The mounting according to the invention is simple, rapid and consequently inexpensive.

Rest pad 1 can be obtained integral with ear 5, by mounting. The metallic inserts necessary for numerous mountings according to the prior art are thus unnecessary. The loop of the support arm can be slightly open and does not require any welding.

It is understood that numerous elastic materials well known in the prior art can be chosen to realize piece 9. In particular a very large variety of elastomers presenting the required mechanical qualities are known, and neoprene has only been cited in the present description by way of example.

I claim:

1. Process for mounting a nasal rest pad upon a spectacle frame, comprising the steps of:
    (a) passing a tapered end of a piece made of a rubber-type elastic or resilient material through a hole formed in the pad and through another hole formed in the spectacle frame, each of said holes having an opening dimension;
    (b) drawing out this piece in order to place in these holes, a portion of the piece having a transverse cross-section which at rest is greater than the opening dimensions of the holes and which when drawn out has a transverse cross-section which is less than the opening dimensions of the holes; and
    (c) releasing the piece so as to block the piece in the holes so that said portion of the piece returns to its transverse cross-section at rest which is greater than the opening dimensions of the holes, in order to thus assemble the rest pad and the frame.

2. Process according to claim 1, wherein, upon the release of the resilient piece, retaining folds are formed which push together the pad and the spectacle frame toward one another.

3. Process according to claim 2, further comprising the step of cutting ends of the resilient piece protruding beyond the retaining folds.

* * * * *